United States Patent
Oliver et al.

(10) Patent No.: US 8,913,008 B2
(45) Date of Patent: Dec. 16, 2014

(54) IMAGE DATA GENERATION USING A HANDHELD ELECTRONIC DEVICE

(75) Inventors: Robert George Oliver, Waterloo (CA); Christopher Harris Snow, Kitchener (CA); Nazih Almalki, Waterloo (CA); Jeffrey Alton Hugh Dods, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 120 days.

(21) Appl. No.: 13/530,642

(22) Filed: Jun. 22, 2012

(65) Prior Publication Data

US 2013/0342437 A1 Dec. 26, 2013

(51) Int. Cl.
| | | |
|---|---|---|
| *G09G 5/00* | (2006.01) | |
| *G06F 3/033* | (2013.01) | |
| *G09G 5/08* | (2006.01) | |
| *G06F 3/02* | (2006.01) | |
| *G06F 3/041* | (2006.01) | |
| *G06F 3/042* | (2006.01) | |
| *G09G 3/28* | (2013.01) | |
| *G09G 3/22* | (2006.01) | |

(52) U.S. Cl.
USPC ........... 345/156; 345/157; 345/158; 345/165; 345/166; 345/169; 345/173; 345/175; 345/182; 345/183; 345/2.1; 345/2.3

(58) Field of Classification Search
USPC ......... 345/156, 157, 158, 165, 166, 169, 173, 345/175, 182, 183, 2.1, 2.3
See application file for complete search history.

(56) References Cited

U.S. PATENT DOCUMENTS

| | | | |
|---|---|---|---|
| 6,418,325 B1 | 7/2002 | Reber et al. | |
| 6,816,154 B2 | 11/2004 | Wong et al. | |
| 7,466,444 B2 | 12/2008 | Silverbrook et al. | |
| 7,536,201 B2 | 5/2009 | Dunko | |
| 7,855,812 B2 | 12/2010 | Gelsonmini et al. | |
| 2005/0020303 A1 | 1/2005 | Chan | |
| 2005/0243062 A1* | 11/2005 | Liberty | 345/158 |
| 2006/0244738 A1 | 11/2006 | Nishimura et al. | |
| 2007/0139373 A1* | 6/2007 | Simon | 345/157 |
| 2007/0230747 A1* | 10/2007 | Dunko | 382/107 |
| 2007/0236451 A1* | 10/2007 | Ofek et al. | 345/157 |
| 2009/0021510 A1* | 1/2009 | Klintstrom | 345/214 |
| 2010/0128994 A1 | 5/2010 | Zwolinski | |
| 2011/0074679 A1* | 3/2011 | West et al. | 345/163 |
| 2012/0086630 A1* | 4/2012 | Zhu et al. | 345/156 |

FOREIGN PATENT DOCUMENTS

| | | |
|---|---|---|
| EP | 1 255 185 | 11/2002 |
| GB | 2 329 300 | 3/1999 |

OTHER PUBLICATIONS

European Search Report, EP12173185.5, Nov. 23, 2012.

* cited by examiner

*Primary Examiner* — Aneeta Yodichkas

(57) ABSTRACT

The present disclosure provides improved generation of images using a handheld electronic device. Motion of the handheld electronic device is detected using a sensor of the handheld electronic device and data, dependent upon the sensed motion, is transmitted from the device to a remote electronic device. An image, representative of the sensed motion of the handheld electronic device and generated from the transmitted data, is rendered on a display of the remote electronic device and provides a user with visual feedback of the motion of the handheld electronic device. The image data may be generated by the handheld electronic device or by the remote electronic device.

16 Claims, 3 Drawing Sheets

IMAGE DATA GENERATION USING A HANDHELD ELECTRONIC DEVICE

BACKGROUND

Input of data to a computer or other electronic device is commonly provided by a peripheral input device, such as a keyboard, a touch screen, a touchpad, a joystick, a computer mouse, or a graphics tablet and stylus. Some of these input devices may be employed for drawing or handwriting. A computer mouse, for instance, used for drawing or handwriting may be difficult to control since is it designed to be moved by the palm, and not the fingers, of the user. A graphics tablet and stylus provide good user control, and are well suited to desktop applications. However, for mobile applications it may be inconvenient to carry extra input devices.

Touch screen input is particularly difficult for very small, mobile handheld electronic devices having small touch screens. While an integrated stylus may enable a user to input motion data to a mobile, handheld electronic device, it may be difficult for the user to obtain a visual feedback of the image produced on the screen of the device.

It would be advantageous, therefore, to provide an improved way of generating image data using a handheld electronic device.

BRIEF DESCRIPTION OF THE DRAWINGS

Exemplary embodiments of the present disclosure will be described below with reference to the included drawings such that like reference numerals refer to like elements and in which.

DETAILED DESCRIPTION

Figure 1:
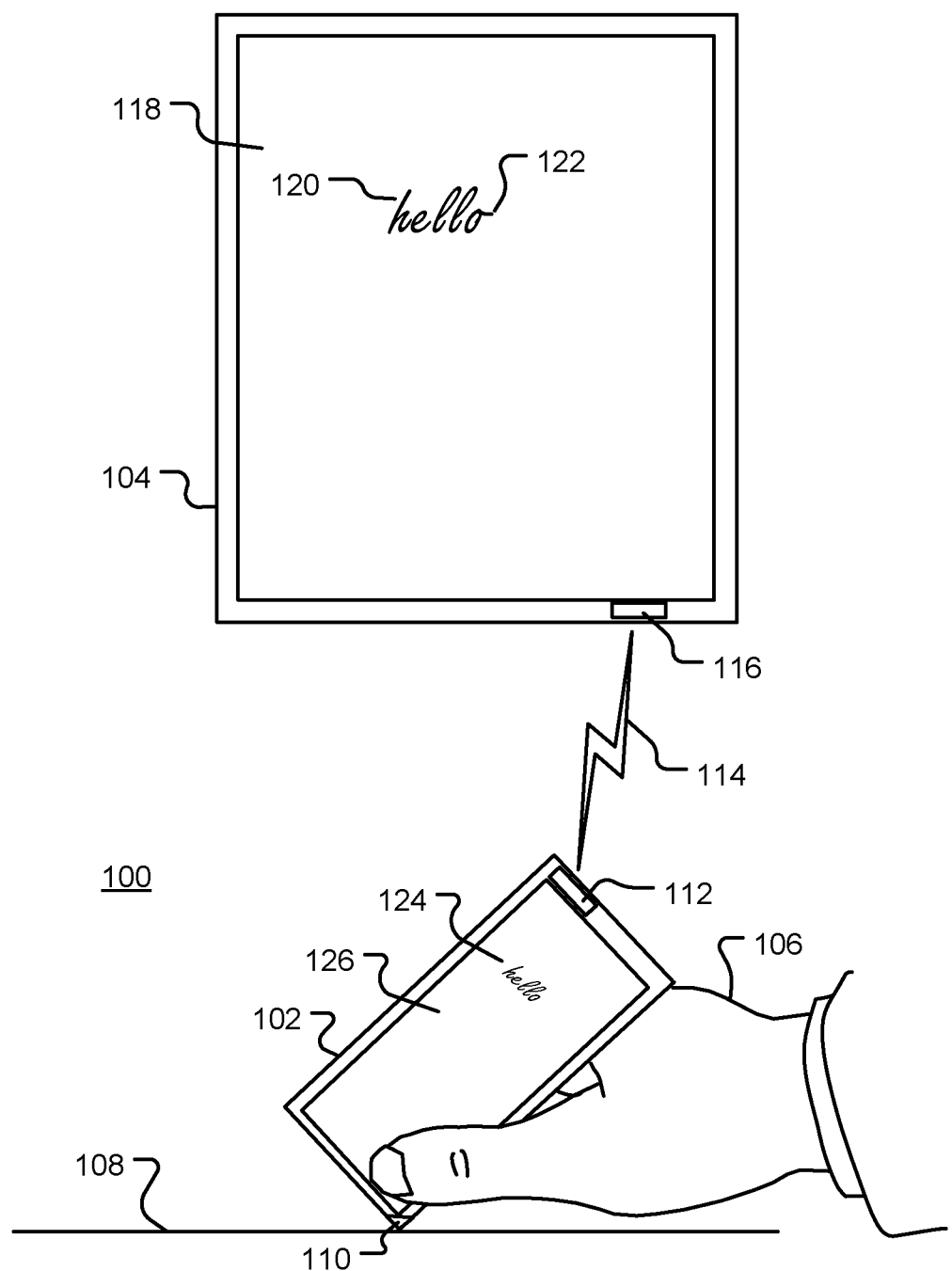
FIG. 1 is a diagrammatic representation of a system for data input in accordance with exemplary embodiments of the present disclosure.

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components have not been described in detail to avoid obscuring the disclosed embodiments. The description is not to be considered as limited to the scope of the embodiments shown and described herein.

An integrated stylus may be employed to provide motion data to a mobile or handheld electronic device. However, if the mobile electronic device is held in a pen-like orientation, it is difficult for a user to obtain a visual feedback of the image produced from the motion data on the screen of the device. This is especially problematic for small mobile electronic devices.

The present disclosure relates to the generation of data input using a handheld electronic device. The data may be input to a computer, such as a laptop computer, a tablet computer, a desktop computer or networked computer, for example, and/or the handheld electronic device. A remote electronic device with a wireless connection to the handheld electronic device may be employed to provide visual feedback to a user. The handheld portable electronic may be a mobile telephone, a personal digital assistant (PDA), a digital audio player, an e-reader, or the like. In one exemplary embodiment, motion of the handheld electronic device is sensed using a motion sensor of the handheld electronic device and corresponding motion data is transmitted to the remote electronic device over a wireless communication channel. In response to the motion data, an image is rendered on the display of the remote electronic device. In an illustrative embodiment, the sensor of the handheld electronic device comprises an optical sensor located at a corner of the handheld electronic device, enabling the device to be used in a pen-like manner.

The image rendered on the remote electronic device display provides a visual feedback to the user and facilitates control of the motion of the handheld electronic device. Such visual feedback may not be available using a display of the handheld electronic device, since the display is small, oriented at an angle to the user, and at least partially obscured by the hand of the user.

The final motion data, and images derived from the motion data, may be used as input data to the handheld electronic device, the remote electronic device, or both. The data may also be transmitted to a network for applications such as virtual meetings, for example.

Generation of the image from the motion data may be performed by the handheld electronic device, by the remote electronic device, or by both the handheld electronic device and the remote electronic device.

In one exemplary application, the image data is interpreted as handwriting and may be converted to characters. In such an application, visual feedback to the user allows characters to be drawn with greater accuracy.

Therefore, in accordance with certain aspects of the present disclosure, there is provided a method for generating an image on an electronic device: sensing motion of a handheld electronic device while a motion sensing application of the handheld electronic device is enabled; transmitting data of the sensed motion to an electronic device that is remote from the handheld electronic device; and rendering an image representative of the sensed motion of the handheld electronic device on a display of the remote electronic device, the image generated from the transmitted data.

In accordance with another aspect of the present disclosure, there is provided an electronic device, comprising a wireless receiver, a wireless transmitter, a processor and a display. The wireless receiver receives data transmitted from a handheld electronic device, the data dependent upon motion of the handheld electronic device. The processor executes a motion-to-image application that generates image data representative of the motion of the handheld electronic device from the received data. An image is rendered on the display from the image data and the wireless transmitter transmits the image data to the handheld electronic device.

In accordance with another aspect of the present disclosure, there is provided a handheld electronic device comprising a processor operable to execute a motion sensing application, a motion sensor operable to sense motion of the handheld electronic device while the motion sensing application is executed by the processor, a wireless transmitter operable to transmit motion data representative of the sensed motion to a remote electronic device, a wireless receiver operable to receive image data from the remote electronic device, the image data representative of the sensed motion and generated from the transmitted motion data, and a display operable to render an image from the received image data.

In accordance with still further aspects of the present disclosure, there is provided a non-transitory processor-readable medium having processor-executable instructions, which when executed by a processor of a handheld electronic device, cause the handheld electronic device to generate motion data representative of sensed motion of the handheld electronic device sensed while a motion sensing application is executed by the processor, motion of the handheld electronic device sensed by a motion sensor of the handheld electronic device; transmit the motion data to a remote electronic device; and receive image data from the remote electronic device over the wireless communication channel. The image data representative of the sensed motion and generated by the remote electronic device in response to the motion data.

In accordance with additional aspects of the present disclosure, there is provided a non-transitory processor-readable medium having processor-executable instructions, which when executed by a processor of a handheld electronic device, cause the handheld electronic device to receive motion data from a handheld electronic device, the motion data descriptive of motion of the handheld electronic device; generate image data from the received motion data; and render on a display of the remote electronic device an image representative of motion of the handheld electronic device and generated from the received image data.

FIG. 1 is a diagrammatic representation of a system 100 for computer input in accordance with exemplary embodiments of the present disclosure. The system 100 includes a handheld electronic device 102 and a remote electronic device 104. In operation, the handheld electronic device 102 is moved by a user 106 across a surface 108. A sensor 110 senses motion of the device 102 as it moves across the surface 108. In one embodiment, the sensor 110 comprises an optical sensor, similar to a sensor used in an optical computer mouse. Alternatively, the sensor may be a two or three axis accelerometer. Other motion sensors may be employed without departing from the present invention. A transmitter of wireless communication module 112 of the handheld device is used to transmit motion data, or image data derived from the motion data, over a communication channel 114 to a wireless communication module 116 of the remote electronic device. Thus, a receiver of the wireless communication module 116 receives data transmitted from the handheld electronic device 102, the data corresponding to motion of the handheld electronic device with respect to a surface, or corresponding to image derived from the motion. In one embodiment, the sensor 110 comprises an optical sensor, or miniature track-ball, located in a corner of the handheld electronic device. In a further illustrative embodiment, the motion sensor comprises an accelerometer located in proximity to a corner. In operation, an image dependent upon the transmitted data is rendered on a display 118 of the remote electronic device 104. In the example shown, the image 120 comprises handwritten text. The text follows the trajectory of the handheld electronic device 102, the end point 122 of the trajectory corresponding to the most recent position of the handheld electronic device 102. The motion data, or images derived from the motion data, may be employed for a variety of purposes. For example, motion data may be used to generate graphical input for use with a drawing application executed on the remote electronic device, or motion data may be used to enter handwritten text to be processing by a handwriting recognition application executed on the remote electronic device.

In one exemplary embodiment, the image 120 is duplicated as image 124 on a display 126 of the handheld electronic device 102. The image 124 may be generated by the handheld electronic device 102 or may be generated by the remote electronic device and transmitted to the handheld electronic device 102 from the remote electronic device 104.

Figure 2:
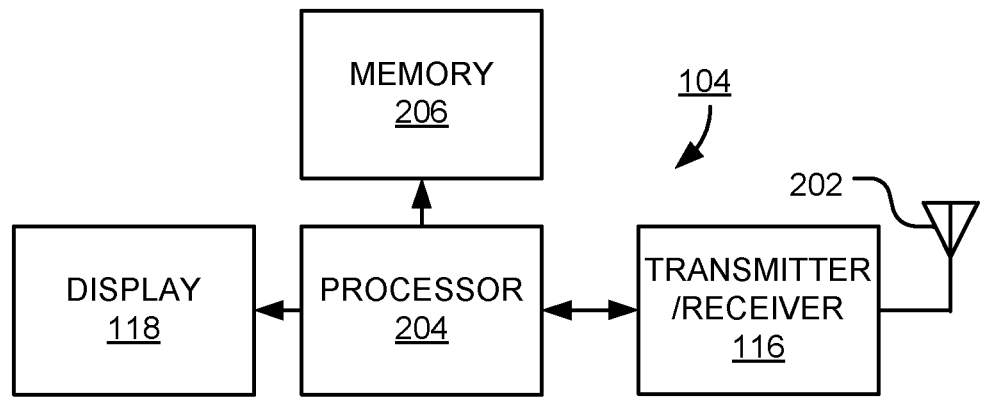
FIG. 2 is a block diagram of a remote electronic device in accordance with exemplary embodiments of the present disclosure.

FIG. 2 is a block diagram of a remote electronic device 104 in accordance with exemplary embodiments of the present disclosure. The remote electronic device 104 includes a wireless communication module 116. In the example shown, the wireless communication module 116 uses an RF antenna 202. However, other forms of wireless communication may be employed as well. In operation, the wireless communication module 116 receives motion data from a handheld electronic device and supplies it to a processor 204. The processor uses the motion data, in accordance with a motion-to-image mapping application executed on the processor, to generate images that are rendered on the display 118. The remote electronic device 104 may also include a memory 206 that may be used to store the image data of the motion data or both. In a further embodiment, image data is received from a handheld electronic device and rendered on the display 118.

Figure 3:
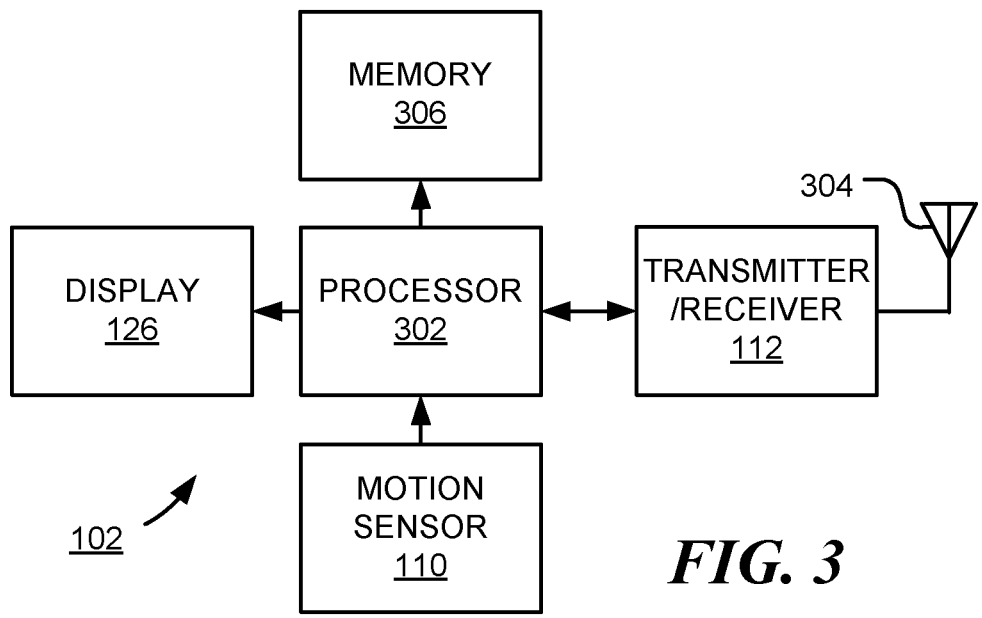
FIG. 3 is a block diagram of a handheld electronic device in accordance with exemplary embodiments of the present disclosure.

FIG. 3 is a block diagram of a handheld electronic device 102 in accordance with exemplary embodiments of the present disclosure. The handheld electronic device 102 may be, for example, a mobile telephone, a PDA, a digital audio player, an e-reader, or other handheld device. The handheld electronic device 102 includes a motion sensor 110 that senses motion of the handheld electronic device 102, a processor 302 that forms motion data corresponding to the sensed motion, and wireless communication module 112. In the exemplary embodiment shown, the wireless communication uses an RF antenna 304; however, other forms of wireless communication may be used. Optionally, the motion data may be stored in a memory 306.

In one exemplary embodiment, an image dependent upon the motion data is rendered on a display 126 of the handheld electronic device 102. The image 124 may be generated within the handheld electronic device 102 or it may be transmitted to the handheld electronic device 102 from the remote electronic device 104 using wireless communication module 112.

Figure 4:
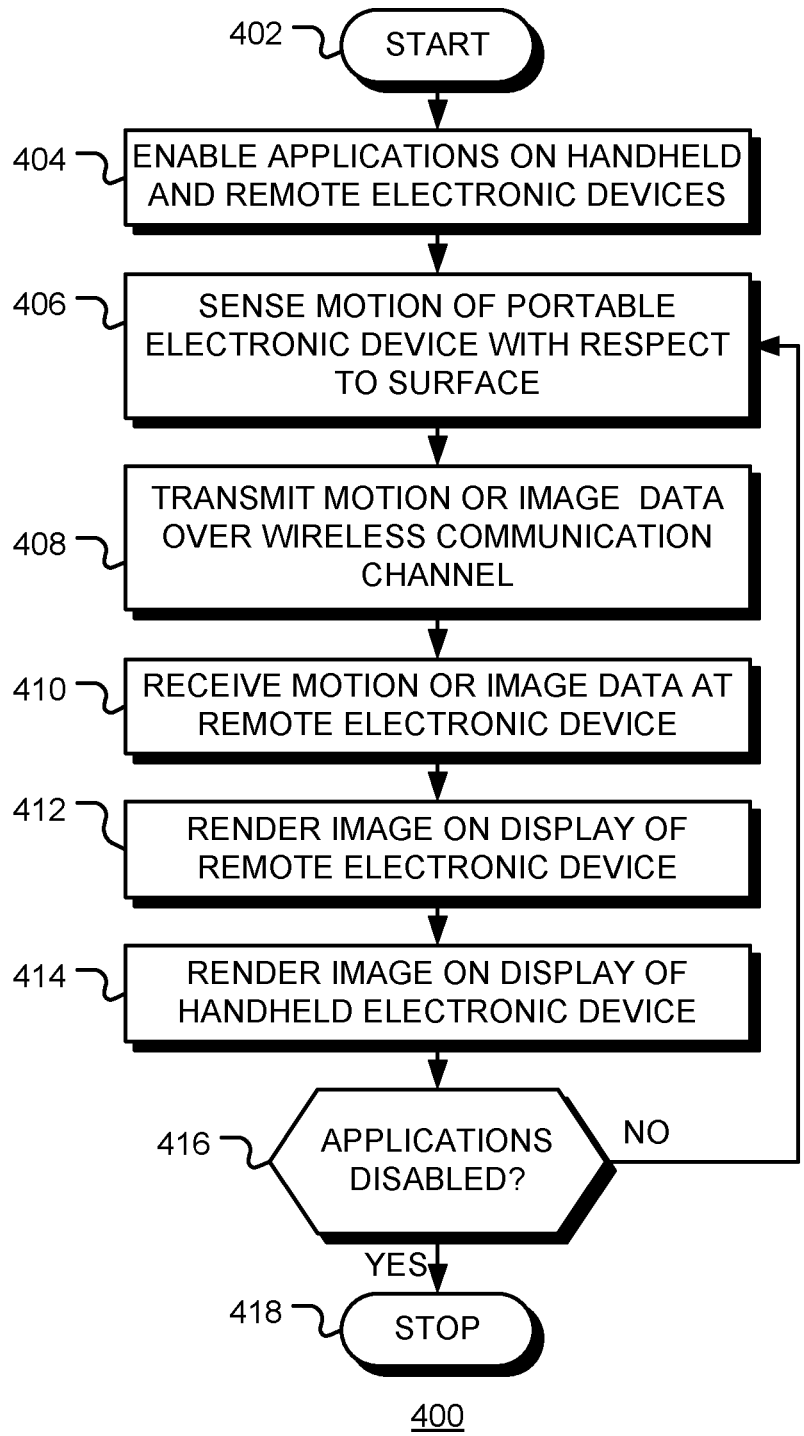
FIG. 4 is a flow chart of a method for data input, in accordance with exemplary embodiments of the present disclosure.

FIG. 4 is a flow chart of a method 400 for image data generation in accordance with exemplary embodiments of the present disclosure. Following start block 402, applications are enabled on a remote electronic device and on a handheld electronic device at block 404. These applications may include motion sensing and motion-to-image mapping applications to interpret motion of the handheld device, control communication between the handheld device and a remote electronic device, and control rendering of images on the displays. At block 406, motion of the handheld electronic device is sensed and, at block 408, corresponding data, relating to the motion directly and produced by a motion sensing application executing on the handheld electronic device or relating to images derived from the motion and generated by a motion-to-image application executing on the handheld electronic device, is transmitted by the handheld electronic device to the remote electronic device over a wireless communication channel. The data is received by the remote electronic device at block 410 and is used, at block 412, to render an image on the remote electronic device display. If the data received by the remote electronic device is only motion data, a motion-to-image mapping application executing on the remote may generate image data used to render an image on the remote electronic device. Optionally, at block 414, a corresponding image is displayed on a display of the handheld electronic device. In one exemplary embodiment, the image displayed on the remote electronic device is transmitted back to the handheld electronic device. In a further illustrative embodiment, the image is generated on the handheld electronic device from the sensed motion or from the motion data. If the application executing on the handheld electronic device or the remote electronic device is terminated, as depicted by the positive branch from decision block 416, the method terminates at block 418. Otherwise, as depicted by the negative branch from decision block 416, flow returns to block 406.

It will be appreciated that any module or component disclosed herein that executes instructions may include or otherwise have access to non-transient and tangible processor readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The implementations of the present disclosure described above are intended to be merely exemplary. It will be appreciated by those of skill in the art that alterations, modifications and variations to the illustrative embodiments disclosed herein may be made without departing from the scope of the present disclosure. Moreover, selected features from one or more of the above-described embodiments may be combined to create alternative embodiments not explicitly shown and described herein.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method for generating an image on an electronic device, comprising:
   sensing motion of a handheld electronic device using a sensor of the handheld electronic device while a motion sensing application of the handheld electronic device is enabled;
   transmitting data of the sensed motion to an electronic device that is remote from the handheld electronic device; and
   rendering an image representative of the sensed motion of the handheld electronic device on a display of the remote electronic device, the image generated from the transmitted data,
   where the sensor is located at a corner of the handheld electronic device, enabling the handheld electronic device to be used in a pen-like manner, and where sensing motion of the handheld electronic device comprises sensing motion of the corner of the handheld electronic device with respect to a surface in contact with the corner of the handheld electronic device.

2. The method of claim 1, where the sensor comprises an optical sensor.

3. The method of claim 1, where the sensor comprises an accelerometer.

4. The method of claim 1, further comprising:
   in response to the sensed motion of the handheld electronic device, rendering an image on a display of the handheld electronic device.

5. The method of claim 1, where the transmitted data comprises image data representative of the sensed motion of the handheld electronic device, the method further comprising:
   a motion-to-image mapping application enabled on the handheld electronic device generating the image data in response to the sensed motion.

6. The method of claim 5, further comprising:
   rendering the image data on a display of the handheld electronic device.

7. The method of claim 1, where the handheld electronic device comprises one of a mobile telephone, a personal digital assistant (PDA), a digital audio player, and an e-reader.

8. A method for generating an image on an electronic device, comprising:
   sensing motion of a corner of a handheld electronic device, with respect to a surface in contact with the corner of the handheld electronic device, while a motion sensing application of the handheld electronic device is enabled;
   transmitting data of the sensed motion to an electronic device that is remote from the handheld electronic device; and
   rendering an image representative of the sensed motion of the handheld electronic device on a display of the remote electronic device, the image generated from the transmitted data,
   where the transmitted data comprises motion data representative of the sensed motion of the handheld electronic device, the method further comprising:
   a motion-to-image mapping application enabled on the remote electronic device generating the image in response to the sensed motion;
   transmitting the image from the remote electronic device to the handheld electronic device; and
   rendering the image on a display of the handheld electronic device.

9. An electronic device configured to enable generation of image data for a handheld electronic device comprising:
   a wireless receiver operable to receive motion data transmitted from the handheld electronic device, the data dependent upon sensed motion of a corner of the handheld electronic device with respect to a surface in contact with the corner of the handheld electronic device;
   a processor operable to execute a motion-to-image application that generates image data representative of the motion of the handheld electronic device from the received motion data;
   a display operable to render an image from the image data; and
   a wireless transmitter operable to transmit the image data to the handheld electronic device.

10. The electronic device of claim 9, where the image comprises a trajectory that follows motion of the handheld electronic device while a motion sensing application of the handheld electronic device is enabled.

11. A handheld electronic device comprising:
a processor operable to execute a motion sensing application;
a motion sensor operable to sense motion of a corner of the handheld electronic device, with respect to a surface in contact with the corner of the handheld electronic device, while the motion sensing application is executed by the processor;
a wireless transmitter operable to transmit motion data representative of the sensed motion to a remote electronic device;
a wireless receiver operable to receive image data from the remote electronic device, the image data representative of the sensed motion and generated from the transmitted motion data; and
a display operable to render an image from the received image data,
where the motion sensor is located at a corner of the handheld electronic device, enabling the handheld electronic device to be used in a pen-like manner.

12. The handheld electronic device of claim 11, where the sensor comprises one of an optical sensor, an accelerometer, and a miniature track-ball.

13. The handheld electronic device of claim 11, where the handheld electronic device comprises one of a mobile telephone, a personal digital assistant (PDA), a digital audio player, and an e-reader.

14. A non-transitory processor-readable medium having processor-executable instructions, which when executed by a processor of a handheld electronic device, cause the handheld electronic device to:
generate motion data representative of sensed motion of a corner of the handheld electronic device with respect to a surface in contact with the corner of the handheld electronic device, the motion sensed while a motion sensing application is executed by the processor, motion of the handheld electronic device sensed by a motion sensor located at a corner of the handheld electronic device;
transmit the motion data to a remote electronic device over a wireless communication channel; and
receive image data from the remote electronic device over the wireless communication channel, the image data representative of the sensed motion and generated by the remote electronic device in response to the motion data.

15. The non-transitory processor-readable medium of claim 14 having further processor-executable instructions, which when executed by the processor of the handheld electronic device, cause the handheld electronic device to:
render the image data as an image on a display of the handheld electronic device.

16. A non-transitory processor-readable medium having processor-executable instructions, which when executed by a processor of an electronic device, cause the electronic device to:
receive motion data from a handheld electronic device, the motion data descriptive of motion of a corner of the handheld electronic device with respect to a surface in contact with the corner of the handheld electronic device;
generate image data from the received motion data;
render on a display of the remote electronic device an image representative of motion of the handheld electronic device and generated from the received image data; and
transmit the generated image data to the handheld electronic device.

* * * * *